(No Model.)
W. F. MANZ & C. H. SWAB.
MILK CAN.
No. 292,440. Patented Jan. 22, 1884.
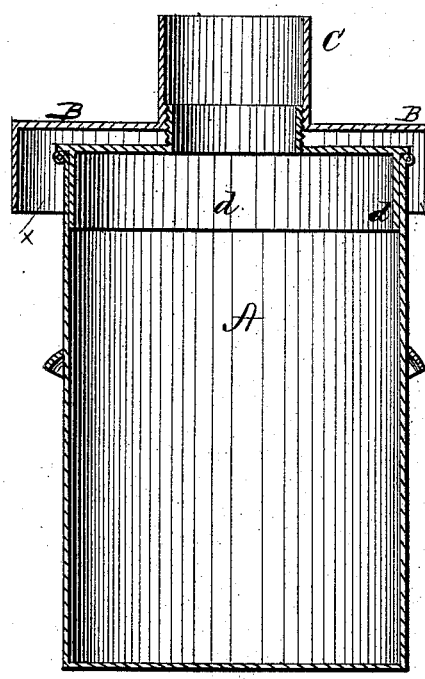
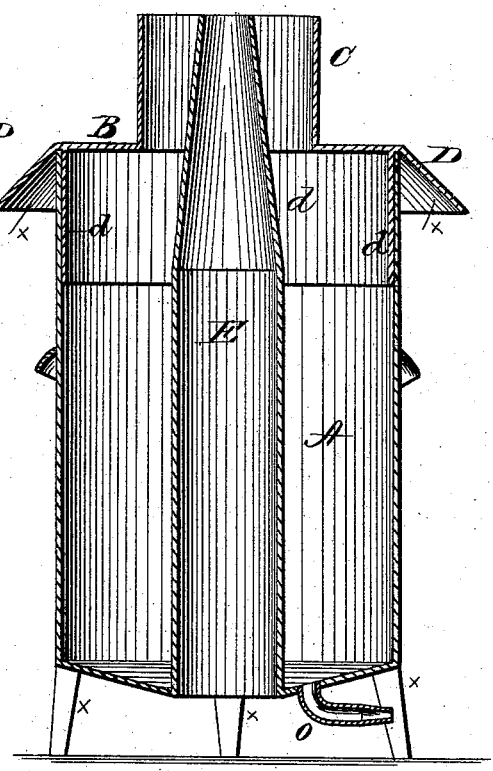
WITNESSES
Franck L. Ouraud
Robert Lynch
INVENTORS.
William F. Manz
and Charles H. Swab
by L. Deane, ATTORNEY

UNITED STATES PATENT OFFICE.

WILLIAM F. MANZ AND CHARLES H. SWAB, OF CEDAR RAPIDS, IOWA.

MILK-CAN.

SPECIFICATION forming part of Letters Patent No. 292,440, dated January 22, 1884.

Application filed April 13, 1880. (No model.)

*To all whom it may concern:*

Be it known that we, WILLIAM F. MANZ and CHARLES H. SWAB, of Cedar Rapids, in the county of Linn and State of Iowa, have invented certain new and useful Improvements in Milk-Cans, of which the following is a specification.

The invention consists in a cover for a milk-can made with two downwardly-extending flanges or rims, the inner one of which fits inside the top of the can, the outer one extending beyond the outside of the can. The inner flange extends some distance downward into the can, so that its lower edge shall be below the surface of the milk contained in the can. Said lower edge is thus covered by the body of the milk, and the entrance to and passage through the milk of the air contained in the space between the inner flange and the inside face of the can is entirely prevented. In the center of the cover is an unobstructed opening which is surrounded by an upwardly-extending tube to permit the escape of the natural heat of the milk and prevent the entrance of water at this point.

In the accompanying sheet of drawings, Figure 1 represents a vertical section of the cover and an ordinary can. Fig. 2 shows a modified form of cover applied to a can, also in vertical section.

A represents the milk-can, which may be of any shape desired. The cover B is perforated centrally, and is provided with a suitable downwardly-depending flange, *d*, which fits inside the upper part of the can and forms the inner portion of the cover. This flange is surrounded by another one, D, similar in shape, to which its upper part is hermetically attached, either by a screw, as represented in Fig. 1, for greater convenience in cleaning, or permanently, as in Fig. 2, where another style of cover is shown. A tube or flue, C, is fitted to the opening in the cover and extends upwardly from it.

The operation of the cover will now be clearly seen. The can is filled with milk until it reaches a point above the lower edge of the inside flange, *d*, which loosely fits the side of the can, so as to be easily slid up and down therein. The air in the space between the inner flange and the inner face of the can is, by reason of the level of the milk being above the lower end of the inner flange, prevented from entering the milk and passing therethrough, and this body of air forms a cushion which prevents the ingress to the milk of the water in the space between the outer flange and the can. The interior of the can is thus completely sealed against the ingress of water and other air than that already forming the cushion. As the can is placed in water, and the top of the cover B submerged, a small amount of air is compressed into the annular space *x*, between the outer flange, D, and the outside of the can, and between the inside of the can and the outside of the inner flange, *d*.

Hitherto cans have either been left open at the top or else completely covered. In an open can there is danger when the can is placed in water to cool the contents, that some of said water will mix with the milk. The objection when the can is completely sealed, has been that it confined all the animal heat, odors, and gases which remained in the milk as it cooled, and rendered it disagreeable. It is the purpose of this invention to render as small as possible, if not to entirely obviate, both of these difficulties, while at the same time the rapid cooling of the milk by the water surrounding the can on the top and all sides is assured.

In Fig. 2 we have shown a construction of milk-can such as we prefer to use. In this construction a tube, E, of taper form at its upper end is connected to the bottom of the can, and extends upward and above the top of the can, and is surrounded by a flue, C, so as to leave a space between the taper tube E, and the flue for the escape of the animal heat from the milk. The bottom of the can is lower in the center where the tube E is placed, and is provided with a suitable outlet.

We are aware that coffee-pots have heretofore been provided with covers having depending flanges resembling ours, but by said covers the water seal is formed by a flange extending downwardly into a trough of water attached to the pot. Said devices have also been provided with a central opening in which a valve is located, said valve being so arranged as to prevent the escape of aroma. These devices do not embody or represent our invention, and we lay no claim to them.

Having thus described our invention, what we claim as new, and desire to secure by Letters Patent, is—

1. The milk-can cover B, provided with an inner flange or rim, d, extending down within the can, and another flange or rim extending downwardly outside and about the can at its top, as shown, and having a central and unobstructed aperture surrounded by an upwardly-extending flue or tube, C, substantially as shown and described.

2. A milk-can combined with a cover having a central and unobstructed opening and an inner and an outer flange, whereby when the can is placed in water a water-seal is obtained around the upper edge of the can and a ventilating-opening provided for its upper parts, substantially as described.

WILLIAM F. MANZ.
CHARLES H. SWAB.

Witnesses:
R. H. GILMORE,
J. M. ST. JOHN.